United States Patent [19]
Deshayes et al.

[11] 3,732,016
[45] May 8, 1973

[54] METHOD AND APPARATUS FOR MEASURING MATERIAL THICKNESS

[75] Inventors: Philippe-Marie Deshayes, Neuville des Dieppe; Guy Paul Weber, Arques La Bataille, both of France

[73] Assignee: La Cellophane, Paris, France

[22] Filed: Feb. 10, 1971

[21] Appl. No.: 114,184

[30] Foreign Application Priority Data

Mar. 25, 1970 France................7010636

[52] U.S. Cl....................356/161, 250/218
[51] Int. Cl..................G01b 11/00, G01r 21/46
[58] Field of Search............324/120; 250/218; 356/161

[56] References Cited

UNITED STATES PATENTS 3,378,676  8/1968  Clement.................250/219 TH
3,473,122  10/1969  Holt......................324/120

OTHER PUBLICATIONS

"Thin Film Gauging Device"; IBM Tech. Disclosure Bull., Vol. 8, No. 11, pp. 1584–85.

Primary Examiner—Ronald L. Wibert
Assistant Examiner—Conrad Clark
Attorney—Sherman & Shalloway

[57] ABSTRACT

Apparatus for measuring material thickness including a source of light directed toward the material, a light detector receiving light from the source passing by the material and providing an output voltage dependent upon the light received, a voltage to frequency converter providing an oscillating output dependent upon the output voltage from the light detector, and a counter receiving the oscillating output from the converter to represent the thickness of the material by the count stored therein. A method for measuring material thickness including detecting light passed through the material and providing a voltage corresponding thereto, converting the voltage into a frequency signal dependent thereon, and counting oscillations of the frequency signals.

8 Claims, 6 Drawing Figures

INVENTORS,
PHILIPPE-MARIE DESHAYES
GUY PAUL WEBER

BY
Sherman & Shalloway
ATTORNEYS

METHOD AND APPARATUS FOR MEASURING MATERIAL THICKNESS

BACKGROUND OF THE INVENTION

1. Field of the Invention

The present invention pertains to the measurement of the thickness of materials and, more particularly, to the continuous measurement of the thickness of transparent plastic films or coatings deposited thereon.

2. Discussion of the Prior Art

The measurement of the thickness of materials, such as transparent films and coatings thereon, without contacting the surface of the material is required for many manufacturing and production processes. Conventional apparatus for providing such measurements operate, for example, by measuring the degree of absorption of X-rays or β-rays per unit of surface of a material passing by the device. Such conventional devices have the disadvantages of being relatively expensive, extremely sensitive to variations in humidity, and unsafe when utilized in an organic solvent environment. Furthermore, such conventional devices have the disadvantage of determining measurements from only a small portion of the surface of the material, which portion normally is only on the order of a few square millimeters.

Another approach to the measurement of material thickness is the utilization of the properties of photosensitive cells to optically determine the thickness by reflective or transparent characteristics of the material. Such apparatus have, in the past, had the disadvantage of providing measurements by analogy, and their precision is directly related to their expense. Furthermore, such apparatus do not compensate for elements and disturbances which should not be permitted to interfere with the measurements.

Thus, it will be appreciated that for those numerous applications requiring continuous, precise control of films and/or coatings thereon, the only manner in which such control can be obtained is by greatly increasing production costs. That is, for applications where coatings must be continuously and automatically deposited in very thin layers on surfaces of a moving material such as a transparent film, precision control is required but cannot be provided by prior art thickness measuring apparatus due to the great expense and inherent inaccuracies associated therewith.

SUMMARY OF THE INVENTION

Accordingly, it is an object of the present invention to provide a method and apparatus for automatically and continuously measuring the thickness of a passing material and/or a coating thereon economically and with great precision.

The present invention is generally characterized in apparatus for measuring the thickness of a material including a light source projecting light toward the material, a light detector receiving the projected light from the material and providing electrical signals corresponding thereto, a converter receiving the electrical signals and providing oscillating output signals having a frequency dependent upon the electrical signals, and a counter receiving the output signals to represent the thickness of the material by the count stored therein. The present invention is further characterized in a method of measuring the thickness of a material comprising the steps of projecting light on the material, detecting light passed through the material, and providing an electrical signal corresponding thereto, converting the electrical signal to an oscillating signal, and counting the oscillations of the oscillating signal to represent the thickness of the material.

Another object of the present invention is to determine small variations in thicknesses while integrating data obtained in response to a relatively consistent surface thickness in order to detect and remedy undesirable irregularities of surface thickness caused by machines producing the material without being influenced by purely local or accidental variations.

A further object of the present invention is to continuously measure the thickness of a passing coating regardless of the light transmission characteristics of the support film.

The present invention has another object in the measurement of film thicknesses by translating variations in light transmission into modulated frequency.

Some of the advantages of the present invention over the prior art are that precise material thickness measurements can be obtained inexpensively without interference from outside or minor disturbances, that coating thicknesses can be continuously measured regardless of light transmission characteristics of the support therefor, and that the elements of the apparatus can easily be made flameproof for use in organic solvent environments.

Other objects and advantages of the present invention will become apparent from the following description of the preferred embodiments taken in conjunction with the accompanying drawings.

DESCRIPTION OF THE PREFERRED EMBODIMENTS

Figure 1:
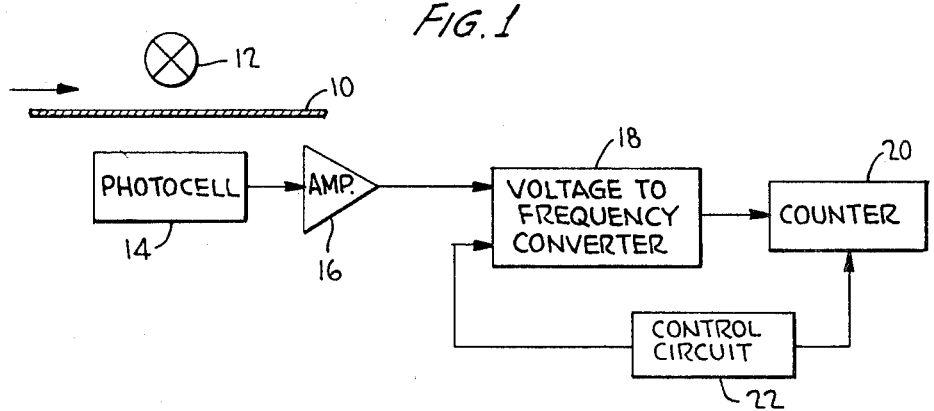
FIG. 1 is a schematic diagram of apparatus for measuring material thickness in accordance with the present invention.

An apparatus for determining the thickness of a material 10, such as a film having transperency dependent upon thickness, is illustrated in FIG. 1 and includes a light source 12 for projecting light through the film 10 to a photocell 14 disposed on the opposite side of the film. As is well know, photocell 14 has a varying resistance in accordance with light received thereby, and the output of the photocell is represented as a voltage varying with received light, which voltage is supplied through an amplifier 16 to a voltage-to-frequency converter 18. Converter 18 is operative to provide an oscillating signal output to a counter 20; the oscillating signal having a frequency corresponding to the voltage received thereby from photocell 14. The operation of converter 18 and counter 20 is controlled by a time control circuit 22 such that the count stored in counter 20 is representative of the number of pulses received during a fixed operating period.

Time control circuit 22 may be any conventional circuit which provides operating and inhibiting outputs to establish a precise operating period, and one embodiment of such a circuit may take the form of an angular light coder which includes a disc having a plurality of light paths therethrough. The disc is driven by a synchronous motor, and light projected through the disc is detected and utilized to control the operation of converter 18 and the periodic resetting of counter 20 to zero.

In operation, variations in light flux received by photocell 14 from light source 12, which variations are caused by changing thickness or other irregularities of film 10, are converted to an oscillating signal by converter 18, and the oscillations are counted by counter 20 to represent changes over the fixed operating time as determined by control circuit 22. Periodic functioning of converter 18 is controlled by control circuit 22; and, thus, a continuous measurement of thickness of the film 10 is provided by the apparatus of FIG. 1 with counter 20 being re-set at the end of each operating period to permit the obtention of comparative results. It will be appreciated that film 10 is continuously moving past light source 12 and photocell 14, and the movement of film 10 is important to the present invention as related to the operating time set by control circuit 22.

When the material 10 consists of a coating on a support film that presents a negligible variation of light transmission in comparison to the variation produced by the coating, the apparatus of FIG. 1 provides accurate measurements; however, it is necessary to calibrate the apparatus to compensate for changes in the support film. Such compensation is automatically provided by the apparatus of FIG. 2, which is illustrated as used with a coating and drying machine 24 that receives a support film 26 and supplies a coating 28 thereto.

Figure 2:
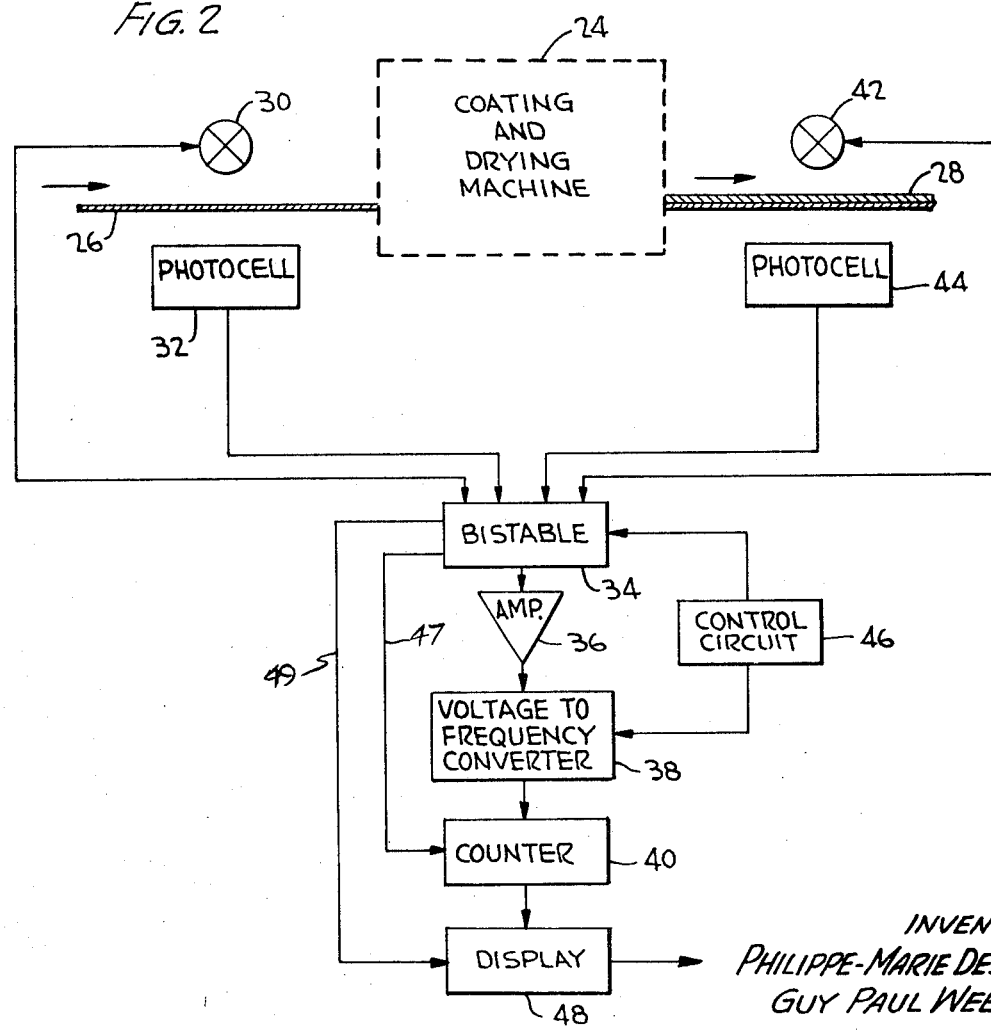
FIG. 2 is a schematic diagram of another embodiment of the present invention for use in measuring coating thickness.

The apparatus of FIG. 2 includes a light source 30 disposed upstream of machine 24 and adapted to project light through film 26 to a photocell 32. The output of photocell 32 is gated by a bistable multivibrator 34 and supplied through an amplifier 36 to a voltage-to-frequency converter 38. The output of converter 38 provides an oscillating signal having a frequency corresponding to the voltage output of photocell 32 in the same manner as explained with respect to the apparatus of FIG. 1, and the output from converter 38 is supplied to a reversible counter 40.

A light source 42 is disposed downstream of machine 24 and adapted to project light through the film 26 and the coating 28 deposited thereon to a photocell 44 which supplies a voltage output through bistable multivibrator 34 and amplifier 36 to converter 38. It will be appreciated that the output of photocell 32 provides a reference value corresponding to the thickness of film 26, and the output of photocell 44 provides a voltage representative of the thickness of both film 26 and coating 28.

A time control circuit 46 controls the operation of bistable multivibrator 34 and converter 38 in the same manner as described with respect to the apparatus of FIG. 1. Bistable multivibrator 34 has an output 47 controlling the operation of counter 40 and an output 49 controlling the operation of a visual display 48 which may take the form of a plurality of Nixie tubes operative to visually represent the count stored in counter 40.

In operation, bistable multivibrator 34 is selectively controlled by the time control circuit 46 such that the output of photocell 32 corresponding to the thickness of film 26 is gated through the bistable multivibrator 34 to converter 38, and oscillations from converter 38 are represented in counter 40 over a fixed operating period. Bistable multivibrator 34 is thereafter triggered by time control circuit 46 such that the output from photocell 44 representative of the thickness of film 26 and coating 28 is supplied to converter 38 and oscillations corresponding thereto are supplied to counter 40 over the fixed operating period. The triggering of bistable multivibrator 34, however, places counter 40 in a reverse counting mode such that the oscillations received from converter 38 are subtracted from the count stored therein representative of the thickness of film 26, and display 48 is energized by bistable multivibrator 34 such that the output of counter 40 is visually represented. It will be appreciated that the final count stored in counter 40 is representative of the difference in thicknesses between the bare support film 26 and support film 26 with coating 28 deposited thereon. That is, the reference thickness determined from photocell 32 is subtracted from the thickness of film 26 with coating 28 thereon to provide a precise output representative of the thickness of coating 28 only.

Control circuit 46 is operative to initially place bistable 34 in a first state to energize light source 30 to provide constant light, to pass voltage signals from photocell 32 to converter 38 and to place counter 40 in a forward counting state. After a time equal to the operating period, control circuit 46 places bistable 34 in a second state to energize light source 42 to provide constant light, to pass voltage signals from photocell 44 to converter 38, to place counter 40 in a reverse counting state and to energize display 48. The next pulse from control circuit 46 resets counter 40 and starts the cycle again. Thus, it can be seen that bistable 34 is operative to selectively supply the electrical output signals from photocells 32 and 44 to converter 38 consecutively to permit the above described difference operation.

Reversible counter 40 may have suitable logic connected therewith such that the output of the counter may be utilized to provide electrical signals corresponding to measured thicknesses, which signals may be utilized to provide a warning or for regulation. Preferably, the output from counter 40 will provide signals corresponding to maximum and minimum permissible thicknesses; and, as long as the measured thickness is within the permissible limits, no signal will be provided by the counter. If the signal exceeds either the maximum or minimum limits, a signal will be provided which may be suitably recorded and utilized to provide an audible or visual warning as well as to regulate the machine 24. In order to assure that the apparatus does not respond to accidental or local defects in the coating, suitable circuitry can be utilized to permit a warning or correction signal only after the repetition of a perdetermined number of similar signals.

The apparatus illustrated in FIG. 2 can simply be utilized so as not to be responsive to local defects by providing an adequate optical system such that the light projected by the light sources is transmitted through a relatively large surface of the coating on the order of square decimeters. Thus, the apparatus of FIG. 2 provides the great sensitivity required for precision coating while permitting large width coating at high speeds.

While the apparatus of FIG. 2 is operative to continuously subtract a reference value corresponding to support film thickness from the film and coating thickness, it has a drawback in that when the thickness of the support film varies, the compensation is not necessarily correct. That is, the reference value utilized is not obtained from the specific portion of the support film carrying the coating which is to be measured; and, therefore, the compensation provided by the apparatus of FIG. 2 is an approximation.

Figure 3:
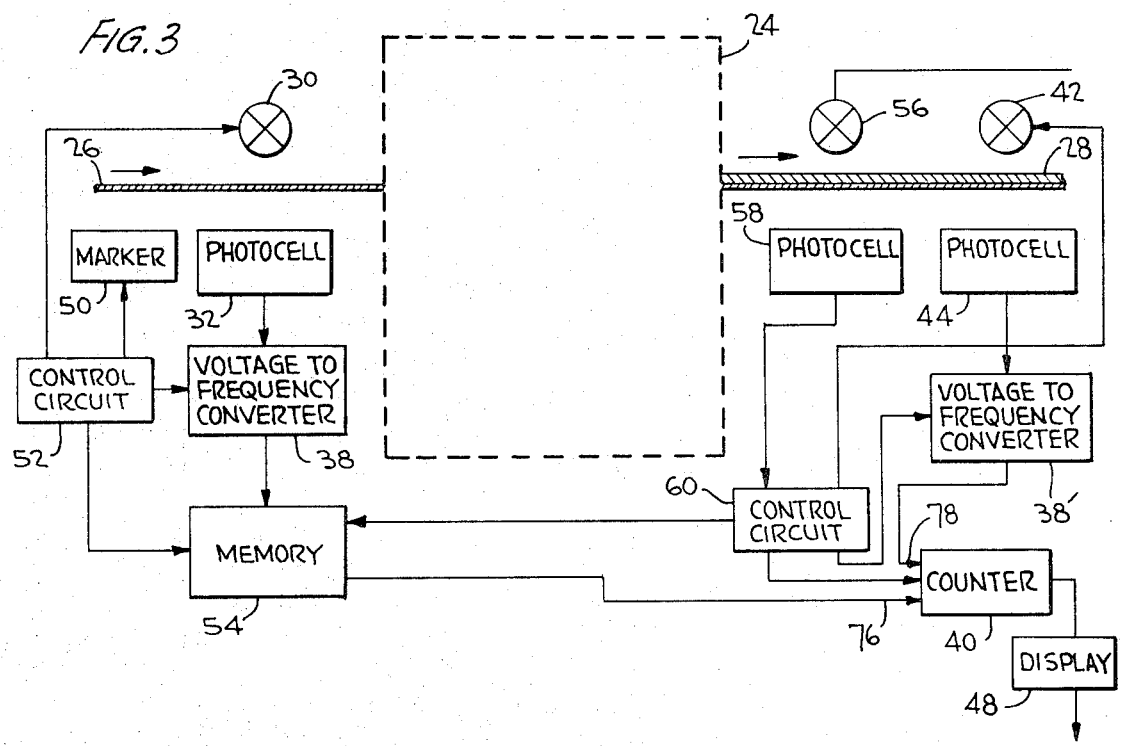
FIG. 3 is a schematic diagram of a modification of the embodiment of FIG. 2.

If the variations in light transmission through the support film seriously affect the measurement, the apparatus of FIG. 3 can be utilized to compare the thickness of a specific portion of a support film with the thickness of that same specific portion of support film after coating. Thus, the primary difference between the embodiments of FIGS. 2 and 3 is the utilization of means to mark and detect specific portions of the support film and to store data pertaining to the thickness thereof for comparison with data relative to the thickness of that same portion with a coating thereon. Accordingly, parts of FIG. 3, which are identical to parts of FIG. 2, are given identical reference numbers and are not described again.

A marking device 50 is controlled by a control circuit 52 which also controls the operation of light source 30, voltage-to-frequency converter 38, and a magnetic memory 54. The marking device 50 provides an indexing mark on the back of film 26 at the location where the thickness is measured, and the indexing mark may be detected downstream of machine 24 by means of an optical circuit including a light source 56 and a photocell 58. Detection of the indexing mark by photocell 58 provides an index signal to a control circuit 60 which controls the operation of light source 42, voltage-to-frequency converter 38', reversible counter 40, and magnetic memory 54.

Figure 4:
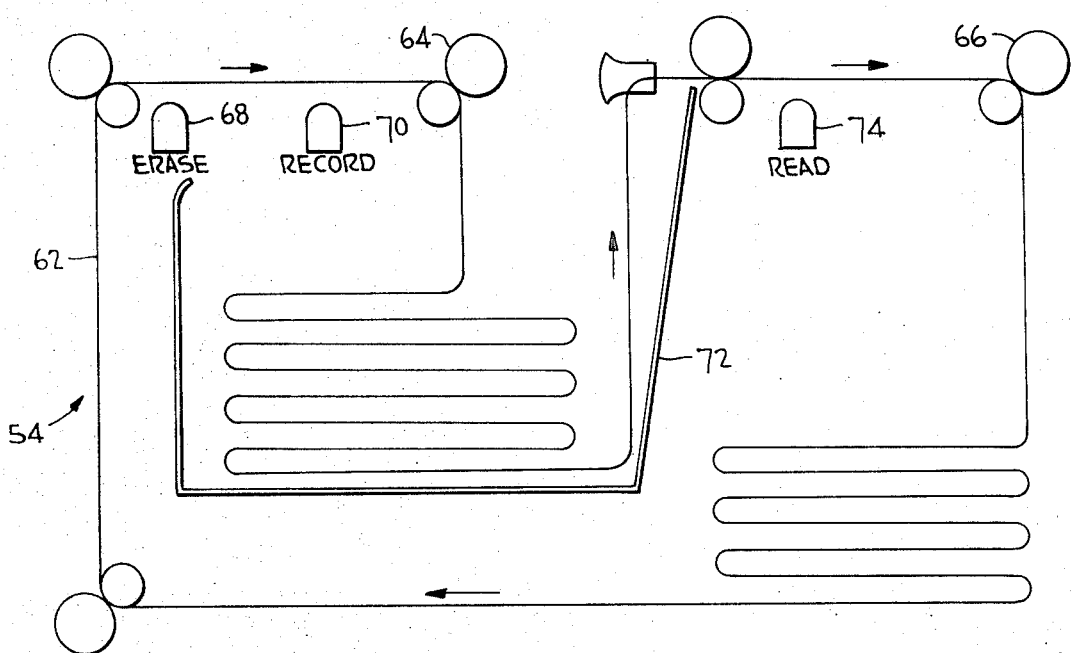
FIG. 4 is a schematic diagram of the magnetic memory of FIG. 3.

The magnetic memory 54 is illustrated schematically in FIG. 4 and includes a two-track magnetic tape 62 which is independently driven by capstans 64 and 66. Capstan 64 is operative to drive magnetic tape 62 past an erase head 68 and a record head 70; and, after passing by capstan 64, the tape is stored in a suitable bin 72. Capstan 66 is operative to pull the tape from bin 72 and move the tape past a read head 74.

In operation, the magnetic memory 54 is initially energized at a time $t_0$ to permit capstan 64 to drive magnetic tape 62 past erase head 68 and record head 70. After a time $\Delta t_1$, which time is required for the tape to be driven at a uniform speed, control circuit 52 is operative to energize converter 38 and marking device 50 such that oscillation frequencies are recorded by means of record head 70 on the first track of tape 62 in accordance with a specific portion of support film 26 and an indexing mark is placed on support film 26.

At the end of the operating period as determined by control circuit 52, a reference value of $n_1$ pulses or oscillations will have been magnetically stored on the first track of tape 62; and, thereafter, converter 38 is de-energized by control circuit 52. When converter 38 is de-energized, a sequence end signal is recorded on the second track of tape 62. At the end of a period which is equal to the time required for capstan 66 to reach a uniform speed, capstan 64 is de-energized and the cycle is ready to be started again. The magnetic tape 62 is, of course, stored in bin 72 while waiting to be read by read head 74.

The indexing mark made on the back of support film 26 is detected by photocell 58 which continuously receives light from source 56, and once the indexing mark is detected an indexing signal is supplied to control circuit 60 to energize the circuit and render converter 38' operative. Control circuit 60 is operative to control the input of data $n_1$ stored on tape 62 in memory 54 to a forward counting input 76 of counter 40 and to supply oscillations or pulses $n_2$ to a reverse counting input 78 of counter 40 such that the count stored in the counter is representative of the difference $n_1$ minus $n_2$. Once the sequence end signal is detected control circuit 60 is de-energized and the apparatus is ready to restart the cycle on the next indexing mark detected.

More specifically, capstan 66, which is stopped by the sequence end signal from voltage-to-frequency converter 38, is energized by control circuit 60 after detection of the indexing mark; and, thus, the pulses $n_1$ corresponding to the thickness of input film 26, as recorded on the first track of magnetic tape 62, are read by read head 74 and supplied to forward input 76 of counter 40, for instance, by means of a conventional editing unit, not shown. The control circuit 60 which was started in response to the sensing of the indexing mark by photocell 58 is then operative to de-energize capstan 66 which awaits the detection of the next indexing mark.

Figure 5:
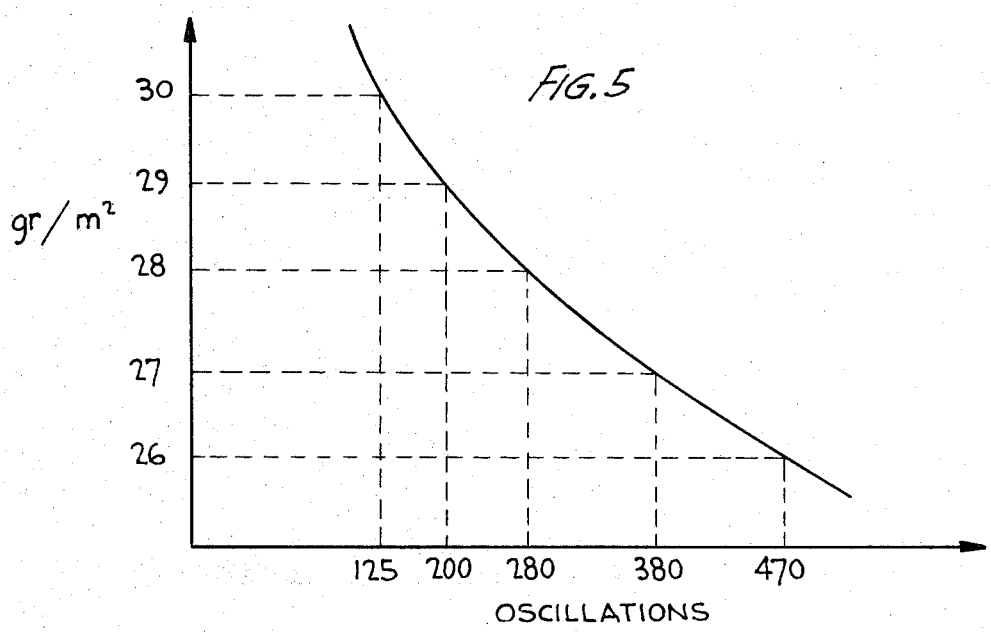
FIG. 5 is a graph illustrating coating thickness as compared to oscillations for a specific example.

The graph in FIG. 5 is illustrative of the precision measurements obtained by the apparatus and method of the present invention. The thickness in grams per square meter of a coating with a base of resin pigmented with zinc oxide disposed on a sheet of cellulose film is represented on the ordinate and the total pulses or oscillations including those utilized in the difference counting operation are plotted along the abscissa. It may be seen that a coating of 28 grams per square meter is maintained within a gram accuracy when counter readings are between 200 and 380 oscillations and within a 2-gram accuracy when counter readings are between 125 and 470 oscillations. Thus, it may be seen that the reading sensitivity of the present invention is much superior to that of the prior art.

The thickness measuring apparatus of the present invention may be utilized in many ways to provide automatic and alarm control; for instance, as described above, the apparatus may be utilized to visually display the sensed thicknesses, or the apparatus can be utilized to emit sound or light warning signals or alarms when the deviations measured exceed acceptable limits. Of course, the readings obtained from the counters of the present invention can be utilized to control well known servo mechanisms to regulate coating within machine 24. If the films to be coated are extremely wide, it is advantageous to utilize two sets of apparatus according to the present invention; and, when utilizing two sets of apparatus, the present invention is further effective to detect defects in the alignment of the coating rollers of machine 24.

Figure 6:
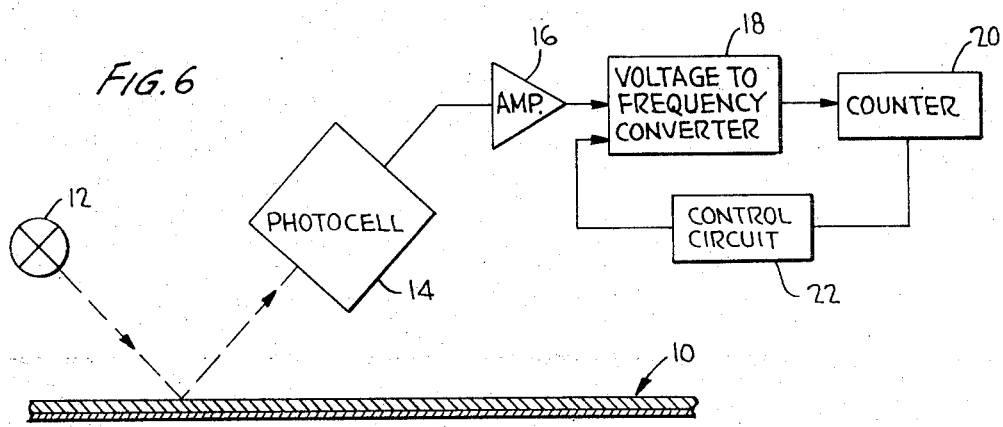
FIG. 6 is a schematic diagram of the apparatus of FIG. 1 utilizing light reflection.

In FIG. 6 there is illustrated an embodiment of the present invention which may be utilized to measure thickness by reflection. It will be appreciated that the apparatus of FIG. 6 is operative in the same manner as previously described with respect to the embodiments of FIGS. 1, 2 and 3; however, the theory of operation of the apparatus of FIG. 6 is based on the reflection of light directed at an angle towards the film and coating rather than passing therethrough. It will also be appreciated that the apparatus of FIG. 6 is merely illustrative and that measurements of increased accuracy and precision may be obtained by utilizing the reflection theory in the manner of the embodiments of FIGS. 2 and 3. Accordingly, parts of the embodiment of FIG. 6 are given reference numbers identical to identical parts of the embodiment of FIG. 1 and are not described again.

Any conventional lamps may be utilized for the light sources 12, 30, 42 and 56 with the subject lamps preferably low voltage operated and having a constant light emission provided by any suitable means, for example, by voltage stabilization and a low performance factor. The photocells 14, 32, 44 and 58 may be any conventional photosensitive elements or light detectors which provide electrical signals dependent upon the amount of light received thereby, such electrical signals being normally provided by a DC circuit including the photocell. The light detectors are preferably provided with specific spectrum distributions in order to avoid as much as possible incident light from the support film. That is, the incident light is avoided by utilizing light detectors having a spectral sensitivity band such that the support film is most transparent and the coating is most opaque. It is further desirable to select a spectrum sensitivity band having wave lengths to avoid variations in humidity; and, if the spectrum sensitivity band is too broad, an appropriate filter may be utilized in the path of the light.

Any conventional amplifier may be utilized to amplify the electrical signals received from the light detectors with the requirement that such amplifiers be operative to linearly amplify current or voltage within the range supplied by the light detector. The voltage-to-frequency convertors may be any conventional voltage controlled oscillators which provide a well defined frequency in response to a predetermined continuous voltage input.

As above described the control circuits 22, 46, 52 and 60 may include angular coding discs driven by constant speed sychronous motors and provided with circular holes therein to permit light to pass therethrough during well defined operating times to electronically activate any number of suitable logic circuits. It will be appreciated that any suitable control circuitry, well known to those of ordinary skill in the art, may be utilized to control the apparatus of the present invention. The counters 20 and 40 are well known and any suitable counters, such as a plurality of interconnected bistable multivibrators may be utilized with the present invention.

It will be appreciated from the above described embodiments that the methods and apparatus of the present invention provide extremely precise thickness measurements requiring only simple adjustments and having a large range of detection. That is, the sensitivity of the present invention can be set as desired dependent upon the sensitivity required with respect to minor variations and irregularities in thicknesses.

In as much as the present invention is subject to many variations, modifications and changes in detail, it is intended that all matter described above or shown in the accompanying drawings be interpreted as illustrative and not in a limiting sense.

What is claimed is:

1. A method for measuring the thickness of a coating applied to a support film by a coating and drying machine comprising the steps of marking a specific portion of the support film upstream of the coating and drying machine with an index mark;

projecting light through the specific portion of the support film upstream of the coating and drying machine;

detecting light passing through the specific portion of the support film and providing first electrical signals corresponding thereto;

converting the first electrical signals to a first oscillating signal;

storing the first oscillating signal;

detecting the index mark on the support film downstream of the coating and drying machine;

projecting light through the coating and specific portion of the support film downstream of the coating and drying machine;

detecting light passing through the coating and specific portion of the support film in response to detection of the index mark and providing second electrical signals corresponding thereto;

converting the second electrical signals to a second oscillating signal; and substracting the oscillations of the second oscillating signal from the oscillations of the stored first oscillating signal to represent the thickness of the coating.

2. The method as recited in claim 1 wherein said steps of providing first and second electrical signals include providing electrical signals having first and second voltages varying with the light detected, respectively;

and said converting step includes converting the first and second varying voltages to first and second varying frequency signals, respectively.

3. The method as recited in claim 2 wherein said steps of converting the first and second electrical signals to the first and second oscillating signals are performed during equal predetermined time periods.

4. Apparatus for measuring the thickness of a coating applied to a support film by a coating and drying machine comprising a first light source disposed upstream of the coating and drying machine to project light toward the support films;

first light detecting means disposed to receive said projected light from the support film and providing first electrical signals corresponding to the amount of light received thereby;

converter means connected with said first light detecting means to receive said first electrical signals and provide a first oscillating output signal having a frequency dependent upon said first electrical signals;

memory means connected with said converter means to store said first oscillating output signal;

marking means disposed adjacent said first light detecting means to place an optical index mark at a specific portion of the support film;

first control means connected with said memory means and said marking means to control the operation thereof, said memory means being responsive to said first control means to store said first oscillating signal corresponding to said first electrical signals determined by light from the specific portion of the support film and the coating thereon;

a second light source disposed downstream of the coating and drying machine to project light toward the coating and support film;

second light detecting means disposed to receive projected light from the coating and support film and providing second electrical signals corresponding to the amount of light received thereby;

said converter means connected with said second light detecting means to receive said second electrical signals and provide a second oscillating output signal having a frequency dependent upon said second electrical signals;

third light detecting means disposed to receive projected light from the coating and support film and providing an index signal upon sensing said optical index mark on the support film;

reversible counting means connected with said memory means and said converter means to receive said first and second oscillating output signals and count the oscillations thereof; and second control means connected with said third light detecting means, said memory means and said counting means and responsive to said index signal to operate said memory means to supply said stored first oscillating output signal to said counting means and to operate said converter means to supply said second oscillating output signal corresponding to said second electrical signals determined by light from the specific portion of the support film and the coating thereon to said counting means, said counting means being operative to count in a first direction in response to said first oscillating output signal and in a second direction opposite to said first direction in response to said second oscillating output signal, whereby said counting means is operative to subtract the thickness of the specific portion of the support film from the thickness of the specific portion of the support film and the coating thereon to represent the thickness of the coating by the count stored therein.

5. The apparatus as recited in claim 4 wherein said first light source and said first light detecting means are disposed on opposite sides of the support film such that light received by said first light detecting means is transmitted through the support film, and said second light source and said second and third light detecting means are disposed on opposite sides of the coating and support film such that light received by said second and third light detecting means is transmitted through the coating and support film.

6. The apparatus as recited in claim 5 wherein said converter means includes a first converter connected with said first light detecting means to receive said first electrical signal and provide said first oscillating output signal to said memory means and a second converter connected with said second light detecting means to receive said second electrical signal and provide said second oscillating output signal to said reversible counting means, said second control means operating said second converter to supply said second oscillating output signal to said reversible counting means.

7. The apparatus as recited in claim 6 wherein said first control means controls said memory means to store said first oscillating output signals for a predetermined operating period.

8. The apparatus as recited in claim 7 wherein said first and second electrical signals provided by said first and second light detecting means are varying frequencies, and said first and second converters each include a voltage-to-frequency converter.

* * * * *